United States Patent [19]
Oki et al.

[11] Patent Number: 5,283,487
[45] Date of Patent: Feb. 1, 1994

[54] STEPPING MOTOR

[75] Inventors: Shigeru Oki; Koji Okada, both of Tokyo, Japan

[73] Assignee: Seiko Instruments Inc., Japan

[21] Appl. No.: 944,483

[22] Filed: Sep. 14, 1992

[30] Foreign Application Priority Data

Sep. 12, 1991 [JP] Japan .................. 3-233171

[51] Int. Cl.$^5$ .......................... H02K 37/00
[52] U.S. Cl. .................. 310/49 R; 310/218; 310/257
[58] Field of Search ............ 310/49 R, 162, 163, 310/164, 165, 257, 218, 42, 156, 89, 90, 91

[56] References Cited

U.S. PATENT DOCUMENTS

| | | | |
|---|---|---|---|
| 4,274,026 | 6/1981 | Haydon | 310/49 R |
| 4,381,465 | 4/1983 | Renkl | 310/49 R |
| 4,942,325 | 7/1990 | Fukaya | 310/257 |
| 4,972,109 | 11/1990 | Kakizaki | 310/49 R |
| 4,985,669 | 1/1991 | Smith | 310/49 R |
| 5,132,603 | 7/1992 | Yoshimoto | 310/49 R |
| 5,177,384 | 1/1993 | Furuki | 310/49 R |

FOREIGN PATENT DOCUMENTS

| | | |
|---|---|---|
| 86054 | 7/1981 | Japan . |
| 133777 | 10/1981 | Japan . |
| 211964 | 12/1982 | Japan . |

*Primary Examiner*—R. Skudy
*Attorney, Agent, or Firm*—Bruce L. Adams; Van C. Wilks

[57] ABSTRACT

A stator yoke is configured for engaging with similarly configured stator yokes of a stepping motor. The stator yoke comprises a cylindrical ring made of a magnetic material and has a first annular edge and a second annular edge. A plurality of tooth poles are integrally formed with the cylindrical ring and are disposed in spaced-apart relation along the first annular edge. The plurality of tooth poles are engageable with a plurality of tooth poles of a similarly configured stator yoke of the stepping motor. The stator yoke has a plurality of locating protrusions integrally formed with the cylindrical ring and disposed in spaced-apart relation along the second annular edge. The plurality of spaced-apart locating protrusions are engageable with locating protrusions of a similarly configured stator yoke of the stepping motor or with a support plate of the stepping motor. The locating protrusions accurately ensure the relative angular position of tooth poles between adjacent phases of the stepping motor. A stepping motor includes an outer stator comprised of the above described stator yokes. A pair of interior stator yokes engage with each other through their respective locating protrusions, and each of a pair of exterior stator yokes engage with a corresponding one of the pair of interior stator yokes through their respective tooth poles.

17 Claims, 9 Drawing Sheets

IF L1>L2, T1<T2 IS HELD

STEPPING MOTOR

BACKGROUND OF THE INVENTION

The present invention relates to a stepping motor of the inner rotor type having multiple stator tooth poles along an inner periphery of the motor, and relates to a stator yoke used in the stepping motor as well as a production method of the stator yoke.

Figure 4:
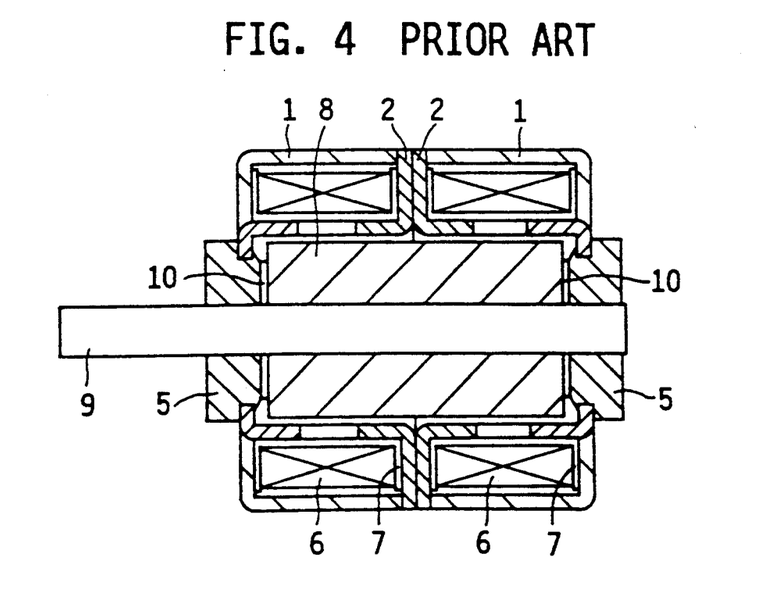
FIG. 4 is a sectional diagram showing a structure of the conventional stepping motor.
Figure 7:
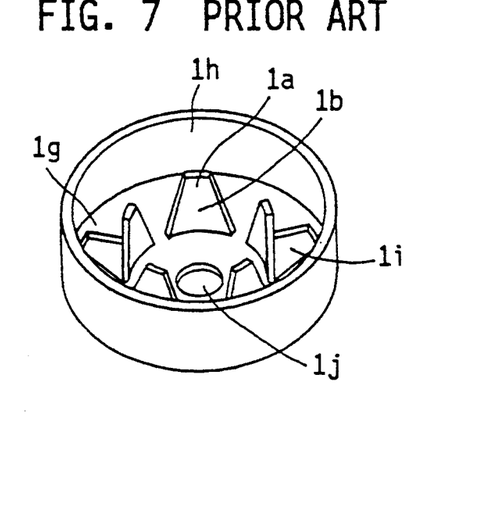
FIG. 7 is a perspective view showing a shape of the conventional stator yoke formed by punching/raising method.
Figure 8:
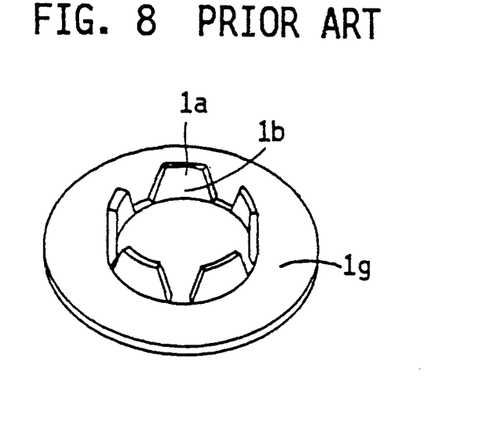
FIG. 8 is a perspective view showing another shape of the conventional stator yoke formed by punching/raising method.
Figure 9:
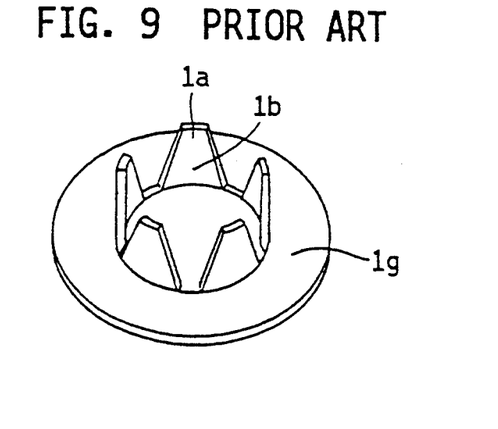
FIG. 9 is a perspective view showing a shape of the conventional stator yoke formed by drawing and punching method.

FIG. 4 illustrates an example of the conventional stepping motor of the inner rotor type. A pair of interior yokes 2 (FIG. 8 or FIG. 9 shows a perspective view thereof) are coupled to each other at their bottom faces. Another pair of exterior yokes 1 (FIG. 7 shows a perspective view thereof), which support respective bearings 5, are coupled in opposed relation to the respective interior yokes 2 along their edge portions to form a stator yoke. A pair of bobbins 7 have wound coils 6 and are disposed around each phase of the stator yoke to thereby form an outer stator. A shaft 9 is fixed to a magnet 8 and to a pair of intermediate washers 10 to form an inner rotor, which is contained in a center of the stator.

Figure 5:
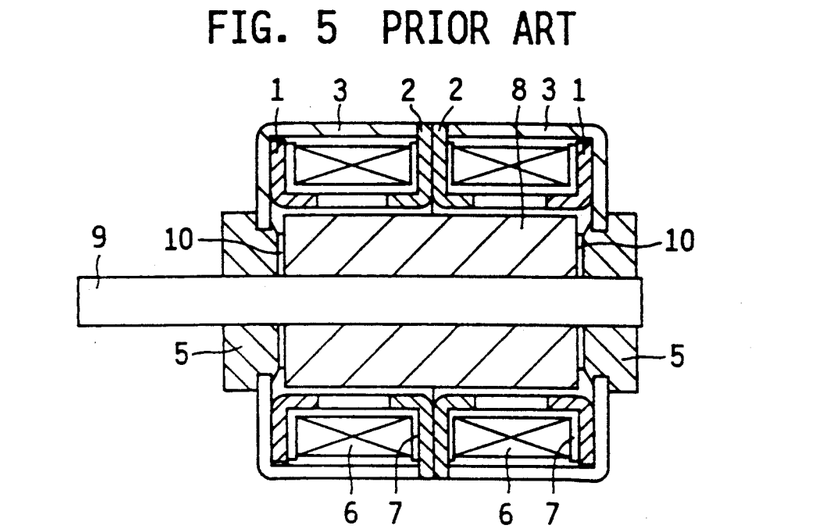
FIG. 5 is a sectional diagram showing another structure of the conventional stepping motor.
Figure 6:
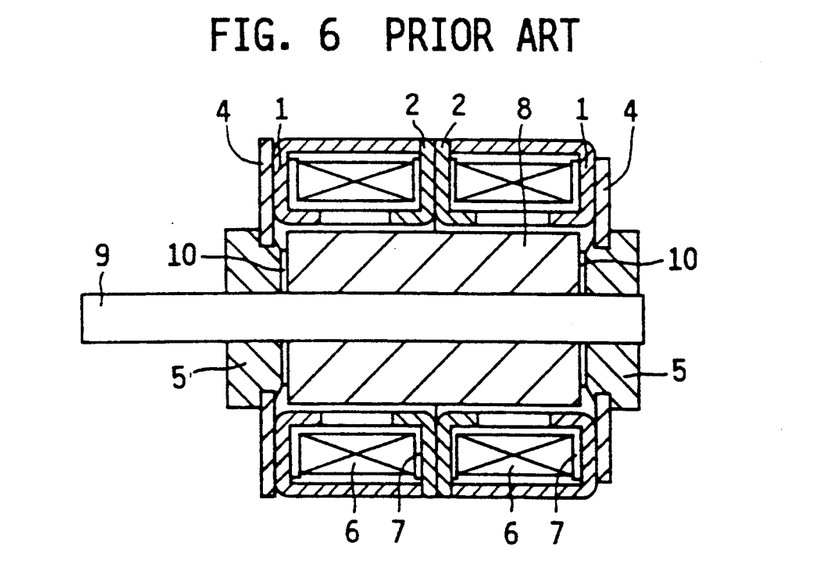
FIG. 6 is a sectional diagram showing a further structure of the conventional stepping motor.
Figure 10:
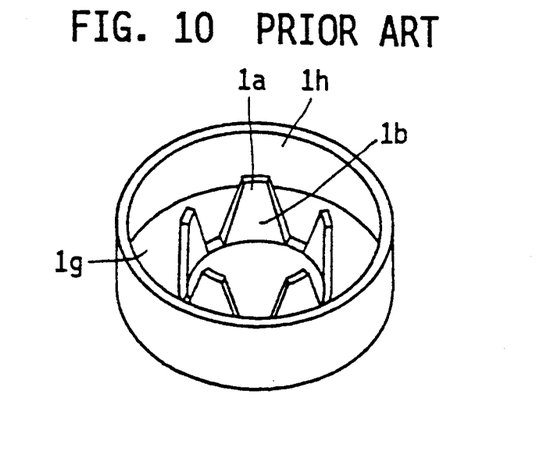
FIG. 10 is a perspective view showing another shape of the stator yoke formed by drawing and punching method.

FIGS. 5 and 6 show other examples of the conventional stepping motor of the inner rotor type. The FIG. 5 motor is different from the FIG. 4 motor in that this motor utilizes yokes of the type shown in FIGS. 8 or 9 for both of the exterior and interior yokes 1 and 2 instead of the exterior yokes shown in FIG. 7 or FIG. 10. Each exterior yoke 1 is fixed to a casing 3 of a cylindrical cup-shape. In similar manner, the FIG. 6 motor is different from the FIG. 4 moter in that this motor utilizes an exterior yoke 1 (FIG. 10 shows a perspective view thereof) which does not have a hole for receiving a bearing 5, and which is attached to a bearing support plate 4.

In making an exterior yoke as shown in FIG. 7, a sheet composed of a magnetic material is drawn to shape a cup to form a ring yoke $1h$ and a bottom plate $1g$. The bottom plate $1g$ is processed to form tooth poles $1a.1b$, corresponding openings $1i$ around the tooth poles and a center hole $1j$ prepared to receive therein a bearing. The tooth poles $1a$ . $1b$ are raised vertically to the bottom plate $1g$. The yoke is formed by the above described punching/raising method.

The FIG. 8 yoke is formed also by the punching/raising method such that tooth poles $1a.1b$ are punched in a center of a bottom plate $1g$ of a magnetic sheet and such that the tooth poles $1a.1b$ are raised vertically from the bottom plate $1g$.

The FIG. 9 yoke is formed such that a sheet of a magnetic material is drawn to form a central convex and then tooth poles $1a.1b$ are punched and raised from a bottom plate $1g$.

The FIG. 10 exterior yoke is formed such that a sheet of a magnetic material is drawn to form a cup to define a ring yoke $1h$ and a bottom plate $1g$. Next, a center of the bottom plate $1g$ is again drawn oppositely and is die-cut to form tooth poles $1a$ $1b$, which are then raised vertically relative to the bottom plate $1g$.

For example, the punching/raising method is disclosed in FIG. 2 of prior art of Japanese patent application Laid-open No. 56-86054, and in FIG. 3 of Japanese utility model registration application Laid-open No. 56-133777. The drawing and punching method is disclosed in Japanese patent application Laid-open Nos. 56-86054 and 57-211964.

Figure 13:
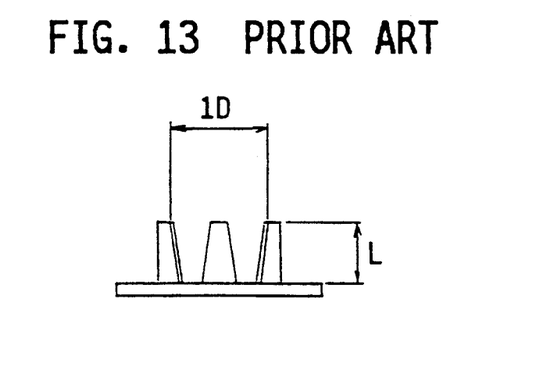
FIG. 13 is an illustrative diagram showing dimensional relation of inner diameter and tooth pole length of the conventional stator yoke.

However, the conventional stepping motor has the following problems:

(1) As shown in FIG. 13, if a stator yoke has a relatively small inner diameter ID and a length L of each tooth pole is set to $L > ID/2$, then an inner yoke cannot be produced by the punching/raising method since the tooth pole is raised from a center of the yoke. The drawing and punching method also has similar difficulty as the length L becomes greater than ID. In case of $L >> ID/2$, the production is impossible. For this reason, in the stepping motor of a small diameter, the stator yoke has also a small inner diameter so that the tooth pole cannot be elongated, hence the motor cannot be elongated axially, thereby failing to improve torque.

Figures 14A, 14B:
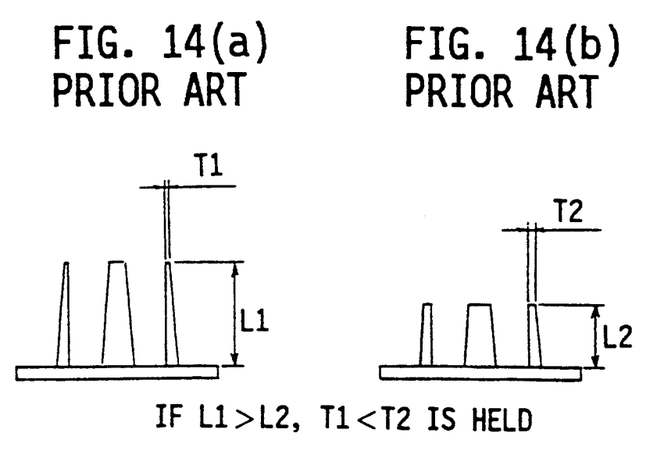
FIGS. 14a and 14b are illustrative diagrams showing the relation between the length and the thickness of a tooth pole formed by drawing and punching method, respectively.

(2) As shown in FIG. 14($a$), if the tooth pole is extensively elongated as compared to the FIG. 14($b$) case, the amount of deformation is increased by the drawing work so that a plate thickness T1 of the tooth pole shown in FIG. 14($a$) is smaller than a plate thickness T2 shown in FIG. 14($b$). Namely, if $L1 > L2$, $T1 < T2$ is held. If such a yoke is used to constitute a magnetic circuit in the motor, there cannot be obtained an effective magnetic flux proportional to the length L1 of the tooth pole to thereby inclease a magnetic flux leakage. For this reason, there cannot be obtained an increase in torque even though the length of the tooth pole is extended.

(3) The drawing and punching method utilizes a die to punch the yoke (as shown in FIGS. 9 and 10). Since the sheet is drawn in a straight cylindrical shape or tapered cup shape along the punching direction, the cutting die has a long cutting stroke during the press-punching of the cylindrical convex, thereby reducing a life of the die. The yield rate of press-punched pieces is reduced for each die thereby increasing the production cost.

(4) With regard to the punching/raising method of raising tooth poles from a center of the yoke (shown in FIG. 8) and the drawing and punching method (as shown in FIGS. 9 and 10), when the yoke has a small inner diameter and therefore has narrow spaces, if a punch or die is dimensioned in a large size to secure the mechanical strength thereof, it is difficult to enlarge an area of each tooth pole and to increase a number of tooth poles, thereby causing drawbacks that the torque is not improved and a step angle is not reduced.

SUMMARY OF THE INVENTION

In order to solve the problems of the prior art, an object of the present invention is to elongate a tooth pole of a stator yoke to improve the motor torque, to increase a number of poles of the moter to obtain fine step angles, to extend the life of a punching die, to avoid thinning of the tooth poles to prevent reduction in the motor torque, and to precisely set a relative angular position between tooth poles of adjacent phases.

According to the present invention, the stepping motor comprises an inner rotor comprised of a cylindrical magnet having multiple magnetic poles magnetized radially, and a shaft engaged through a center of the magnet. An outer stator is provided comprised of a pair of interior stator yokes and another pair of exterior stator yokes, each being disposed around the rotor. The pair of interior stator yokes are coupled with each other through their respective locating protrusions and indentations and are interlaced with each other. The pair of exterior stator yokes are interlaced to respective ones of the interior stator yokes. An annular collar is fixed around those of the coupled locating protrusions and integrated cylindrical rings of the pair of interior stator yokes. Coils are wound around an insulating bobbin disposed around the stator of the interlaced interior and exterior stator yokes. A pair of bearings are disposed to rotatably support respective end portions of the shaft of the rotor. A pair of opposed support plates are disposed to engage with respective locating protrusions of the pair of exterior stator yokes as well as to engage with the respective bearings. A casing is disposed around the annular collar and the coils such as to engage with the support plates to thereby contain therein the coils.

The stator yoke for use in the stepping motor comprises a cylindrical ring composed of a magnetic material. A plurality of tooth poles are arranged along one annular edge of the cylindrical ring at a constant pitch to leave a slit between adjacent tooth poles. Each tooth pole has a desired length between a tooth root and a tooth top and a given widthwise curvature identical to that of the cylindrical ring. The tooth root is wider and the tooth top is narrower, or they have the same width. A plurality of rectangular locating protrusions are arranged along another annular edge of the cylindrical ring in the same number as that of the tooth poles. Each locating protrusion has a length shorter than that of the tooth pole and a width set identical to a spacing from an adjacent locating protrusion to define therebetween a rectangular locating indentation arranged alternately to the rectangular locating protrusion. Each locating protrusion is staggered from each corresponding tooth pole by a given angular interval determined by $360°/\{2\times(\text{tooth pole number of one phase})\times(\text{phase number})\}$. The locating protrusions and the tooth poles are integrally formed with the cylindrical ring.

The method of forming the stator yoke of the stepping motor comprises the steps of:

(a) drawing a sheet of a magnetic material to form a central round convex, (b) die-cutting the round convex to form a shape of a cylindrical ring and locating protrusions along a circular edge of the cylindrical ring, (c) rasing the locating protrusions to elect along a pitch circle identical to that of the cylindrical ring and shaping the locating protrusions having a widthwise curvature identical to that of the cylindrical ring, (d) die-cutting the sheet around a periphery of the round convex to form tooth poles, (e) rasing the tooth poles oppositely to the locating protrusions to elect the tooth poles along a pitch circle identical to that of the cylindrical ring and shaping the tooth poles having a widthwise curvature identical to that of the cylindrical ring, and (f) punching the sheet to separate a stator yoke composed integrally of the locating protrusions, the tooth poles and the cylindrical ring therebetween.

In operation of the stepping motor as constructed above, the coils are applied with an electric current according to a given sequence so as to excite the tooth poles. Consequently, a repulsive force is generated when the opposed magnetic poles of the rotor magnet is in the same polarity relative to the excited tooth poles, and an attractive force is generated in case of the opposite polarity to thereby rotated the rotor magnet step by step, in manner similar to a typical PM type stepping motor.

DETAILED DESCRIPTION OF THE INVENTION

Figure 3:
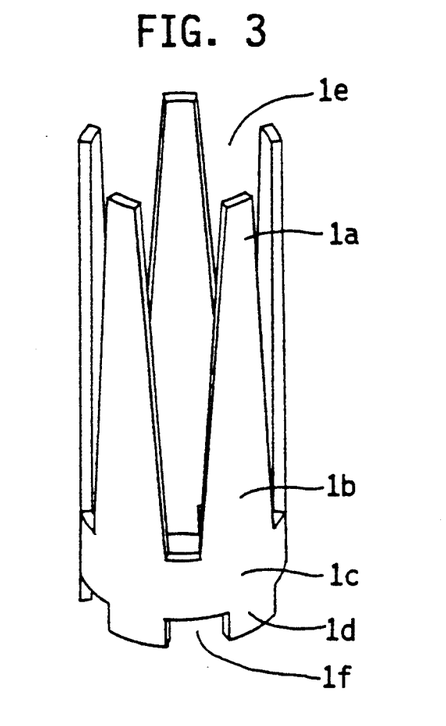
FIG. 3 is a perspective view showing a shape of the inventive stator yoke.

Hereinafter, embodiments of the invention will be described in conjunction with the drawings. Referring to FIG. 3 a shape is shown of the inventive stator yoke, each tooth pole has a tooth top $1a$ and a tooth root $1b$. A cylindrical ring $1c$ is composed of a magnetic material and is formed on its one side integrally with the tooth poles having a desired length and being arranged at a constant pitch leaving a slit $1e$ between adjacent tooth poles. Each tooth pole has a tooth top $1a$ of a smaller width and the tooth root $1b$ of a greater width. Alternatively, the tooth top $1a$ and the tooth root $1b$ may have the same width. Each tooth pole is shaped widthwise arcuately with a given curvature identical to that of the cylindrical ring $1c$. The cylindrical ring $1c$ is formed on its another side integrally with rectangular locating protrusions $1d$ shorter than the tooth pole and arranged in the same number as the tooth poles such that rectangular locating indentations $1f$ are defined alternately with the locating protrusions 1d. The locating protrusion 1d and the locating indentation 1f have the same width and the same pitch. A center of each locating protrusion 1d is staggered from a center of each corresponding tooth pole by an angular difference of 360°/{2×(tooth pole number of one phase)×(phase number)}.

Figure 16:
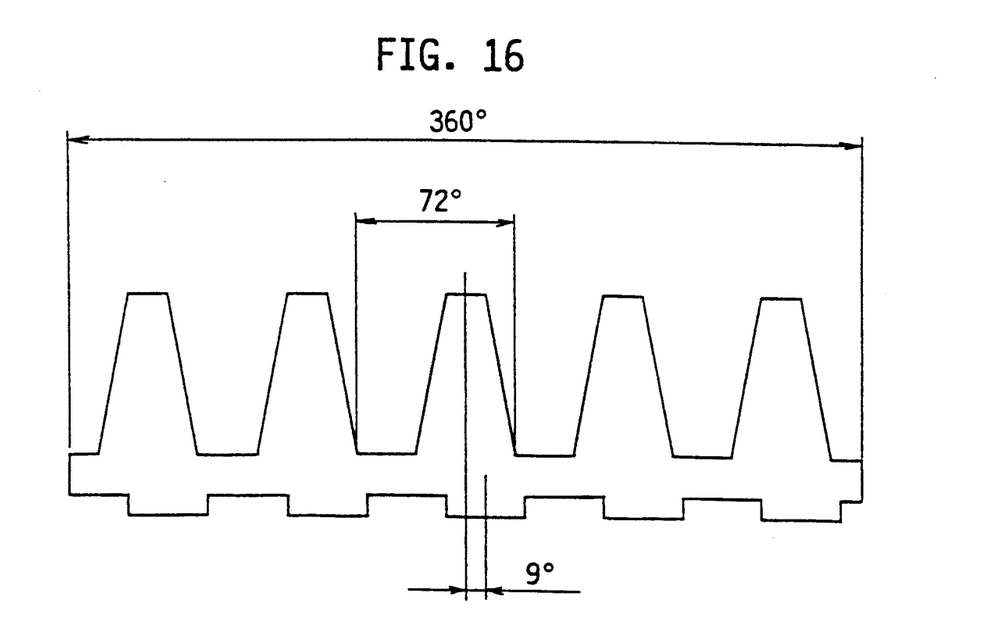
FIG. 16 is an illustrative view showing an example of the staggered relation between tooth poles and locating protrusions of the inventive stator yoke.

FIG. 16 shows an example of the inventive stator yoke. One phase of the stator has 10 tooth poles, since a pair of stator yokes each having 5 tooth poles are coupled with each other. The stator has two phases so that the above noted angular difference is set to 9°. The stator yoke is formed integrally of the tooth poles, the locating protrusions and the cylindrical ring.

Figure 1:
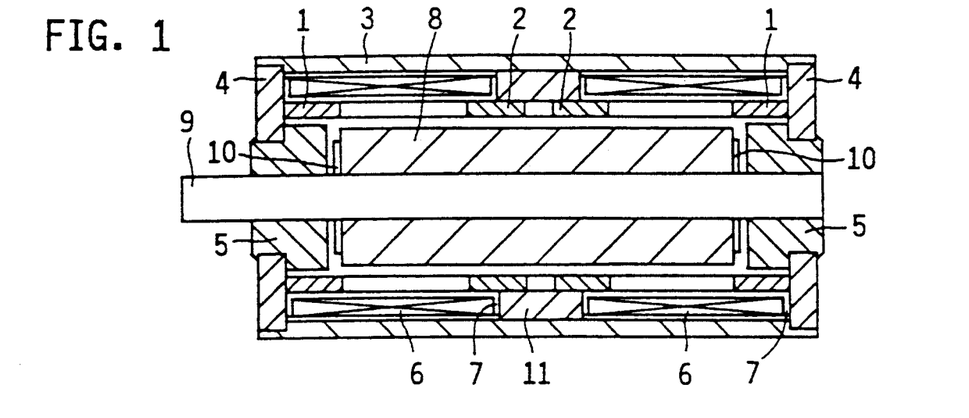
FIG. 1 a sectional diagram showing a structure of the stepping motor utilizing the inventive stator yoke.
Figure 15:
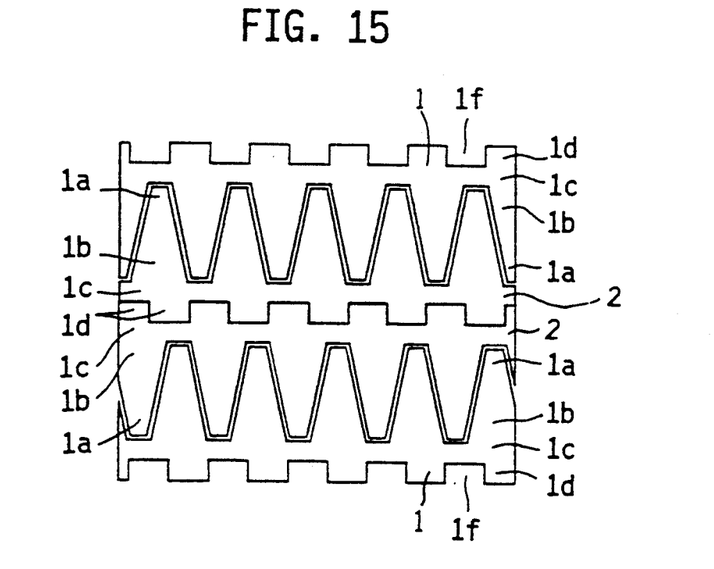
FIG. 15 is a developed diagram showing pairs of the inventive stator yokes interlaced with one another.
Figure 17:
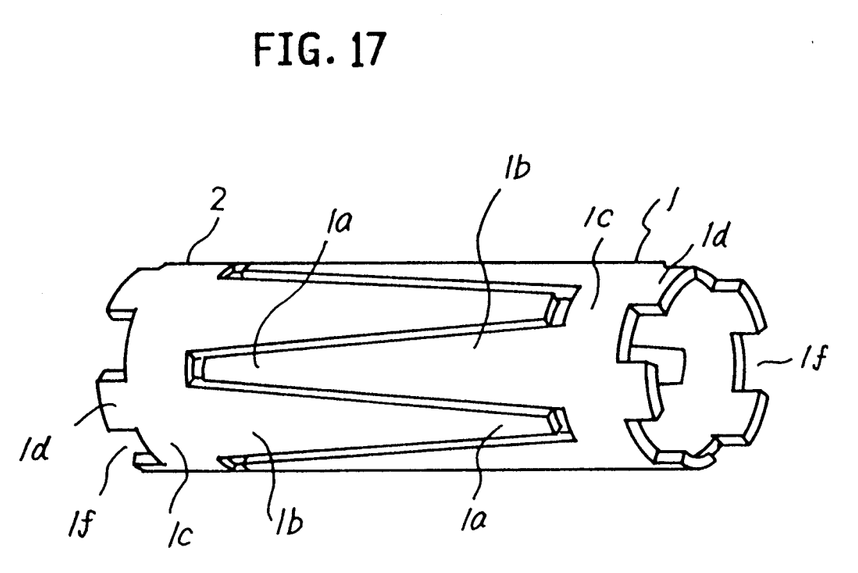
FIG. 17 is a perspective view showing an exterior yoke interlaced with an interior yoke.

FIG. 1 shows one embodiment of the stepping motor utilizing the inventive stator yokes. A pair of interior yokes 2 (FIG. 3 shows their perspective view) are engaged with each other through locating protrusions 1d and the locating indentations 1f interlaced with each other as shown in FIG. 15 of a schematically developed diagram. A annular collar 11 is fixed in place around the coupled portion of the interior yokes 2. Further, the coupled pair of the yokes 2 are mounted within a casing 3. A bobbin 7 having wound coils 6 is fixed between the coupled pair of inner yokes 2 and the casing 3. A pair of support plates 4 receive respective bearings 5. Further, each exterior yoke 1 which has the same shape as that of the interior yoke 2 is engaged to the corresponding support plate 4 through locating protrusions 1d which are inserted into corresponding notches (not shown) formed in the support plate 4. A shaft 9 is attached with a magnet 8 and washers 10 to constitute a rotor. One support plate 4 is fixed to the casing 3 together with the bearing 5 and the exterior yoke 1 so that the exterior yoke 1 is interlaced with one of the coupled pair of interior yokes 2 as shown in FIG. 1, FIG. 15, FIG. 17. Next, the rotor is disposed within the stator. Then, the other support plate 4 is fixed to the opposite side of the casing 3 together with the other bearing 5 and the other exterior yoke 1 so that the other exterior yoke 1 is interlaced with the remaining one of the coupled pair of interior yokes 2.

Figures 2A, 2B:
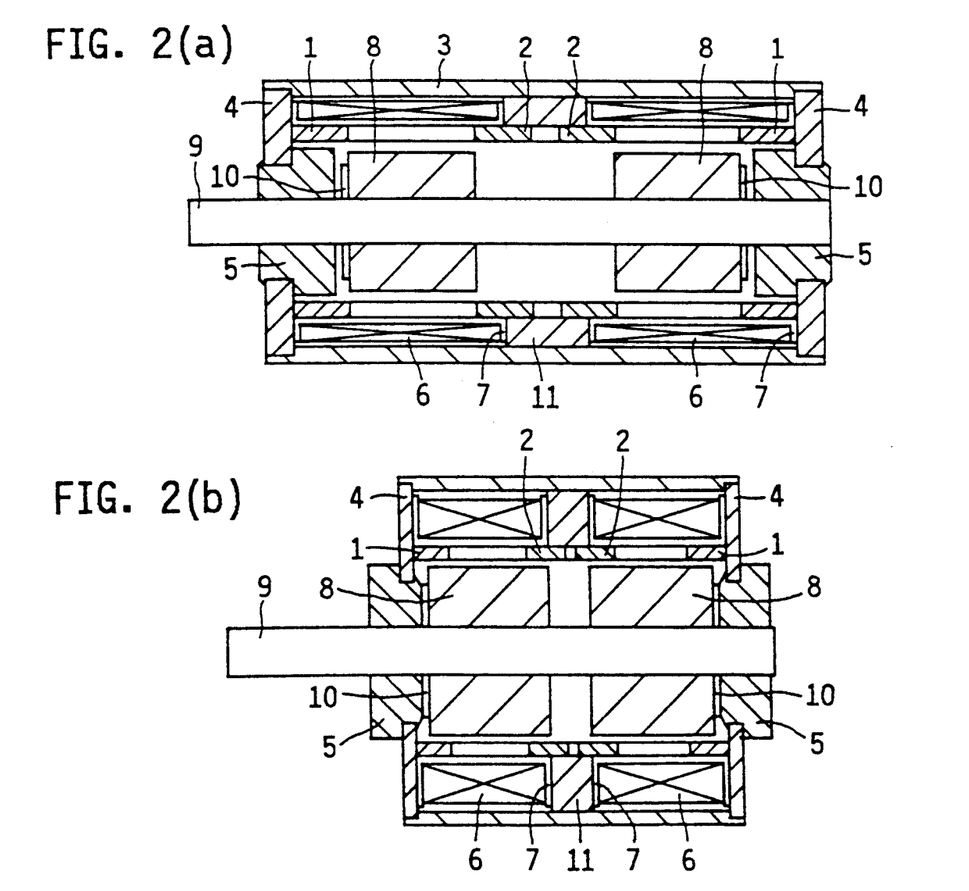
FIGS. 2(a) and 2(b) are sectional diagrams showing structures of other stepping motors utilizing the inventive stator yokes.

FIGS. 2(a) and 2(b) show other embodiments of the invention. The magnet 8 is axially divided into two parts so that the magnet 8 does not face to the cylindrical ring 1c and the locating protrusions 1d (shown in FIG. 3). Consequently, magnetic flux generated from the magnet 8 is prevented from making a short pass to those of the cylindrical ring 1c and the locating protrusions 1d to thereby improve the motor performance.

Figure 11:
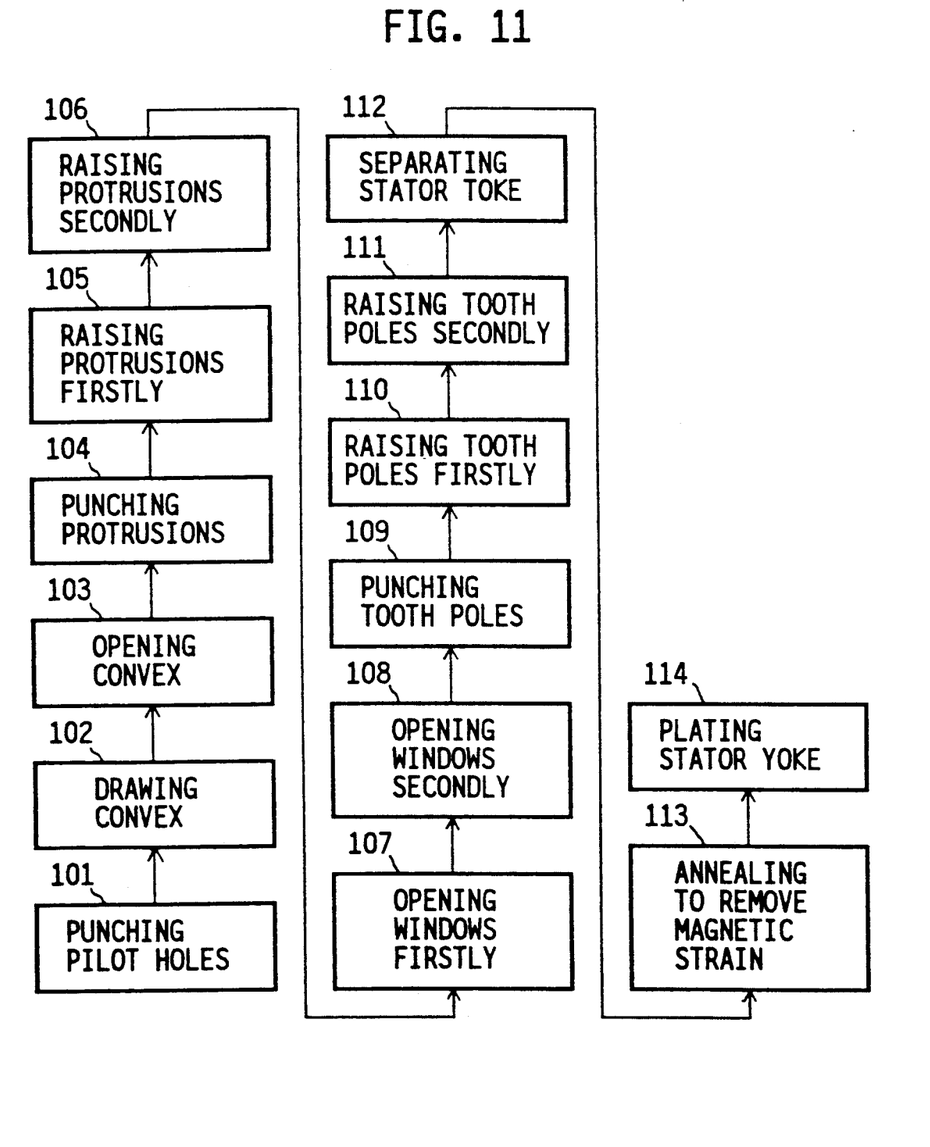
FIG. 11 is a flowchart showing production steps of the inventive stator yoke.
Figure 12:
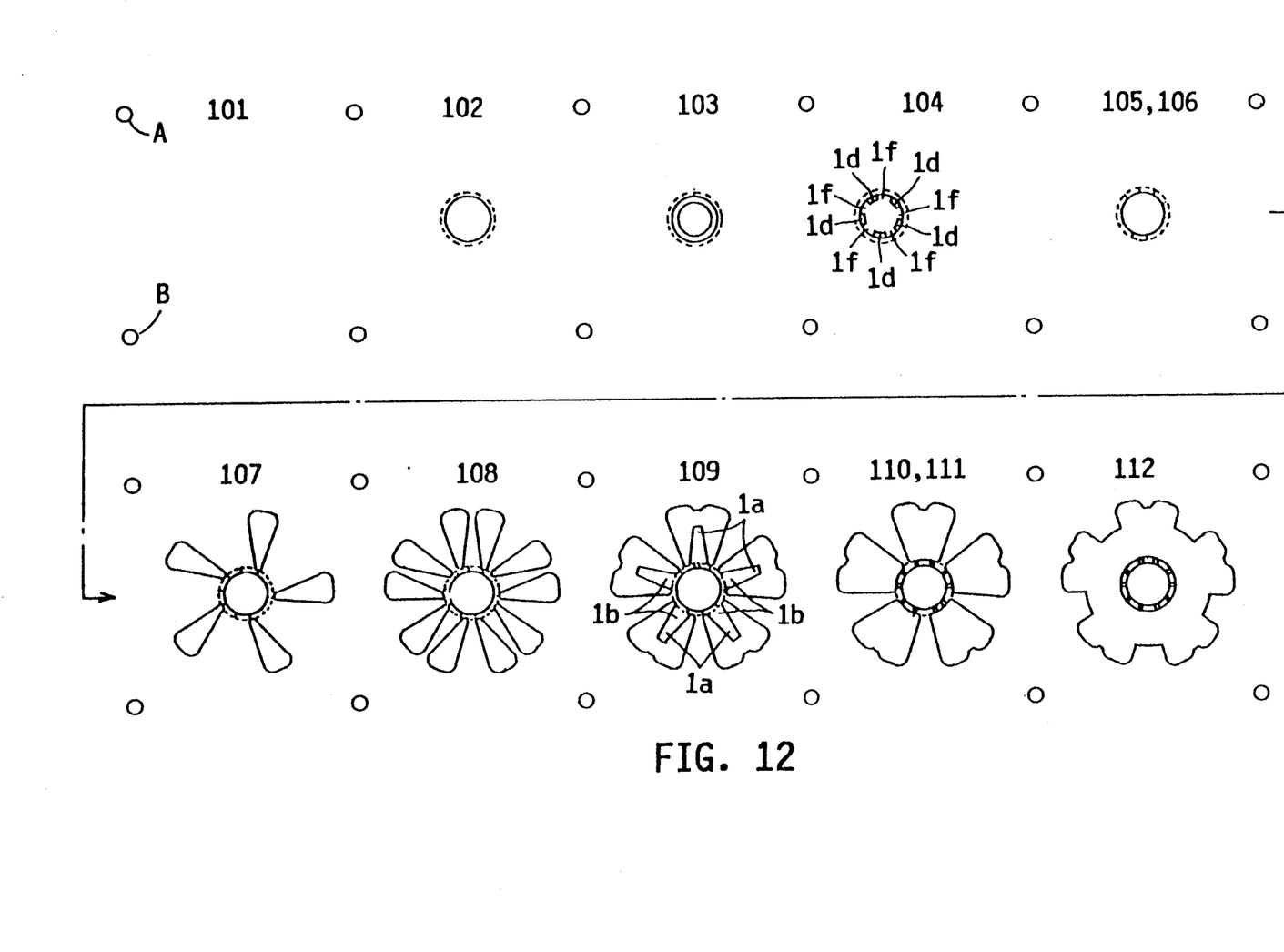
FIG. 12 is an illustrative diagram showing respective stages of the inventive stator yoke during the course of the pressing production by sequential application of dies or molds.

FIG. 11 shows the steps of forming the inventive stator yoke in conjunction with FIG. 12. In step 101, pilot holes A and B are formed by punching in a sheet of magnetic material for use as a positional guide in the following steps. In step 102, the sheet is drawn to form a cylindrical convex having a diameter set identical to a yoke inner diameter with reference to the pilot holes A, B (hereinafter, the holes A, B are used always for the positional guide), in order to form locating protrusions 1d and a cylindrical ring 1c. In step 103, an opening is formed by punching in a center of the convex drawn in the step 102 to leave a peripheral portion of the convex having a height corresponding to those of locating protrusions 1d. In step 104, the convex is punched to shape locating protrusions 1d and locating indentations 1f. In step 105, each locating protrusion 1d is raised radially outward by 70° -80°. Subsequently in step 106, the locating protrusion 1d is further raised by 90° to define a diameter indentical to the yoke inner diameter. In step 107 and step 108, windows are formed by punching in order to form tooth poles of a stator yoke. This process is divided into the two steps because a spacing or slit is narrow between adjacent tooth yokes. In step 109, the sheet is cut by pressing to leave a height of each tooth pole. In steps 110 and 111, the tooth pole is raised radially inward by two stages in manner similar to steps 105, 106 to define a diameter identical to the yoke inner diameter. In step 112, the sheet is punched around a formed stator yoke by a given diameter identical to the yoke outer diameter to thereby separate the stator yoke from the sheet. In step 113, the stator yoke is subjected to magnetic annealing to remove strain. Lastly in step 114, the stator yoke is plated to prevent rust.

According to the invention, as described above, the following effects are achieved.

(1) The inventive stator yoke features a greater number of tooth poles and a longer dimension of each tooth pole even in a small inner diameter of the annular tooth pole arrangement, thereby improving torque of the stepping motor and increasing stepping number per one complete rotation.

(2) In the production of the stator yoke, the sheet is cut in the thickness direction to form tooth poles, thereby prolonging life of punching die.

(3) Since the tooth pole is not drawn to avoid thinning of its thickness, an effective magnetic flux is maintained to prevent reduction in torque.

(4) The locating protrusions of one yoke are engaged with the locating indentations of another yoke to accurately ensure the relative angular position of tooth poles between adjacent phases.

What is claimed is:

1. A stator yoke for use in a stepping motor, comprising:

a cylindrical ring composed of a magnetic material;

a plurality of tooth poles arranged along one annular edge of the cylindrical ring at a constant pitch to define a slit between adjacent tooth poles, each tooth pole having a desired length between a tooth root and a tooth top and a given widthwise curvature identical to that of the cylindrical ring; and a plurality of locating protrusions arranged along another annular edge of the cylindrical ring in a same number as that of the tooth poles, each locating protrusion having a length shorter than that of each of the tooth poles and a width set identical to a spacing from an adjacent locating protrusion to define therebetween a locating indentation arranged alternately to the locating protrusion, each locating protrusion being staggered from each corresponding tooth pole by a given angular interval determined by 360°/2×tooth pole number of one phase×phase number, the locating protrusions and the tooth poles being integrally formed with the cylindrical ring.

2. A stepping motor comprising:

an inner rotor comprised of a cylindrical magnet having a multiple of magnetic poles magnetized radially, and a shaft engaged through a center of the magnet;

an outer stator comprised of a pair of interior stator yokes and another pair of exterior stator yokes, each being disposed around the rotor and being formed according to claim 1, the pair of interior stator yokes being coupled with each other through their respective locating protrusions, the pair of exterior stator yokes being engaged with a respective one of the pair of interior stator yokes through their tooth roots;

an annular collar fixed around the coupled locating protrusions and respective cylindrical rings of the pair of coupled interior stator yokes;

coils disposed around the stator of the engaged interior and exterior stator yokes;

a pair of bearings rotatably supporting respective end portions of the shaft of the rotor;

a pair of opposed support plates engageable with respective locating protrusions of the pair of exterior stator yokes and with the respective bearings; and a casing disposed around the annular collar and the coils such as to engage with the support plates.

3. A stator yoke for use in a stepping motor and configured for engaging with similarly configured stator yokes of the stepping motor, the stepping motor having at least one support plate for supporting a stator yoke, the stator yoke comprising: a cylindrical ring comprised of a magnetic material having a first annular edge and a second annular edge; a plurality of tooth poles integrally formed with the cylindrical ring and disposed in spaced-apart relation along the first annular edge of the cylindrical ring, the plurality of spaced-apart tooth poles being engageable with a plurality of spaced-apart tooth poles of a similarly configured stator yoke of a stepping motor; a plurality of locating protrusions integrally formed with the cylindrical ring and disposed in spaced-apart relation along the second annular edge, the plurality of spaced-apart locating protrusions being engageable with one of the plurality of spaced-apart locating protrusions of a similarly configured stator yoke of a stepping motor and a support plate of the stepping motor.

4. A stator yoke according to claim 3; wherein the tooth poles are disposed along the first annular edge of the cylindrical ring at constant pitch.

5. A stator yoke according to claim 3; wherein the cylindrical ring has a curvature; and the tooth poles have a widthwise curvature identical to the curvature of the cylindrical ring.

6. A stator yoke according to claim 3; wherein each one of the tooth poles has a tooth root at its end integral with the cylindrical ring and a tooth top at its end opposite the tooth root, the tooth root being wider than the tooth top.

7. A stator yoke according to claim 3; wherein each one of the tooth poles has a tooth root at its end integral with the cylindrical ring and a tooth top at its end opposite the tooth root, the tooth root being the same width as the tooth top.

8. A stator yoke according to claim 3; wherein each one of the plurality of locating protrusions is shorter in length than each one of the plurality of tooth poles.

9. A stator yoke according to claim 3; wherein each one of the plurality of locating protrusions has a width that is equal to a spacing from a next adjacent locating protrusion so as to define a rectangular locating indentation between adjacent locating protrusions.

10. A stator yoke according to claim 3; wherein a stator of the stepping motor has a phase equal to a number of tooth poles of a pair of engaged stator yokes, and each one of the plurality of locating protrusions has a center staggered from a center of a corresponding tooth pole by an angular interval determined by $360°/2 \times$ number of tooth poles of one phase $\times$ number of phases.

11. A stepping motor, comprising: a rotor; and an outer stator comprised of a pair of interior stator yokes and a pair of exterior stator yokes, each stator yoke comprising a cylindrical ring comprised of a magnetic material having a first annular edge and second annular edge, a plurality of tooth poles integrally formed with the cylindrical ring and disposed in spaced-apart relation along the first annular edge of the cylindrical ring, the plurality of spaced-apart tooth poles engaging with a plurality of spaced-apart tooth poles of a corresponding similarly configured stator yoke, and a plurality of locating protrusions integrally formed with the cylindrical ring and disposed in spaced-apart relation along the second annular edge, the plurality of spaced-apart locating protrusions engaging with one of a plurality of spaced-apart locating protrusions of a corresponding similarly configured stator yoke and support plate of the stepping motor, each stator yoke being disposed around the rotor, the pair of interior stator yokes being engaged with each other through their respective locating protrusions, and each of the pair of exterior stator yokes being engaged with a corresponding one of the pair of interior stator yokes through their respective tooth poles.

12. A stepping motor according to claim 11; further comprising an annular collar disposed around the engaged locating protrusions of the pair of interior stator yokes.

13. A stepping motor according to claim 11; further comprising coils disposed around the engaged tooth poles of the pair of exterior stator yokes and the pair of interior stator yokes.

14. A stepping motor according to claim 11; wherein the rotor has a shaft; and further comprising a pair of bearings rotatably supporting respective end portions of the shaft.

15. A stepping motor according to claim 11; further comprising a pair of opposed support plates engaged with respective locating protrusions of the pair of exterior stator yokes.

16. A stepping motor according to claim 11; wherein the outer stator has a phase equal to a number of tooth poles of a pair of engaged stator yokes, and wherein each one of the plurality of locating protrusions has a center staggered from a center of a corresponding tooth pole by an angular interval determined by $360°/2 \times$ number of tooth poles of one phase $\times$ number of phases.

17. A stepping motor according to claim 11; wherein the rotor has a shaft, and a first and a second magnet fixed to the shaft, the first and the second magnets being spaced apart so as not to face the locating protrusions and cylindrical rings of the engaged pair of interior stator yokes.

* * * * *